US008662874B2

(12) United States Patent
Rubino et al.

(10) Patent No.: US 8,662,874 B2
(45) Date of Patent: Mar. 4, 2014

(54) COGGED BELT FOR CONVEYING ARTICLES AND/OR FOR POWER TRANSMISSION, AND A METHOD AND AN APPARATUS FOR REALISING THE COGGED BELT

(75) Inventors: Attilio Rubino, Anzola Emilia (IT); Maurizio Vincenzi, Cognento (IT)

(73) Assignee: Vision Tech S.r.l., Calderara di Reno (Bologna) (IT)

( * ) Notice: Subject to any disclaimer, the term of this patent is extended or adjusted under 35 U.S.C. 154(b) by 273 days.

(21) Appl. No.: 12/811,540

(22) PCT Filed: Dec. 31, 2008

(86) PCT No.: PCT/IB2008/003657
§ 371 (c)(1),
(2), (4) Date: Jul. 2, 2010

(87) PCT Pub. No.: WO2009/087472
PCT Pub. Date: Jul. 16, 2009

(65) Prior Publication Data
US 2011/0241251 A1 Oct. 6, 2011

(30) Foreign Application Priority Data

Jan. 3, 2008 (IT) .............................. BO2008A0004
Jun. 18, 2008 (IT) .............................. BO2008A0385

(51) Int. Cl.
*B29C 43/28* (2006.01)
(52) U.S. Cl.
USPC ......................................... 425/122; 264/259
(58) Field of Classification Search
USPC ........................................................ 425/122
See application file for complete search history.

(56) References Cited

U.S. PATENT DOCUMENTS

| 3,999,914 | A | * | 12/1976 | Breher et al. ................. 425/114 |
| 4,034,615 | A | | 7/1977 | Brooks |
| 4,276,039 | A | | 6/1981 | Takano |
| 4,884,998 | A | | 12/1989 | Miranti, Jr. |

FOREIGN PATENT DOCUMENTS

DE 1291473 B 3/1969
DE 3802754 A 3/1989

(Continued)

OTHER PUBLICATIONS

International Search Report, PCT/IB08/0367 Mar. 9, 2009.

*Primary Examiner* — Yogendra Gupta
*Assistant Examiner* — Robert J Grun
(74) *Attorney, Agent, or Firm* — William J. Sapone; Ware Fressola; Maguire & Barber LLP

(57) ABSTRACT

The invention relates to a cogged belt for conveying articles and/or for power transmission, and an apparatus for realization thereof. The cogged belt (30, 50) comprises: a prefabricated belt (8) comprising a textile or a meshed net; and a covering (26) made of a thermoplastic or heat-hardening material fixed in a single body by fusion to the prefabricated belt (8) and substantially entirely covering a side of the prefabricated belt (8), the covering (26) forming a cogged profile (43). The cogged belt (30, 50) can further comprise at least a cord-shaped reinforcing core (61) at least partially incorporated in the covering (26). The apparatus comprises: a cogged pulley (2) activated by actuator organs; two lateral sides (3, 4) fixed to heads of the pulley (2); a contrast belt (5) facing a circular sector of the pulley (2); a supply device (6) of molten thermoplastic or heat-hardening material; a first station (7) for supplying a prefabricated belt (8), and an additional second station (60) for supplying at least a reinforcing core (61).

11 Claims, 8 Drawing Sheets

(56) References Cited

FOREIGN PATENT DOCUMENTS

| | | |
|---|---|---|
| EP | 0010919 A | 5/1980 |
| EP | 0060713 A | 9/1982 |
| EP | 0239334 A | 9/1987 |
| GB | 1039917 A | 8/1966 |
| GB | 2050932 A | 1/1981 |
| WO | WO01/26887 A | 4/2001 |

* cited by examiner

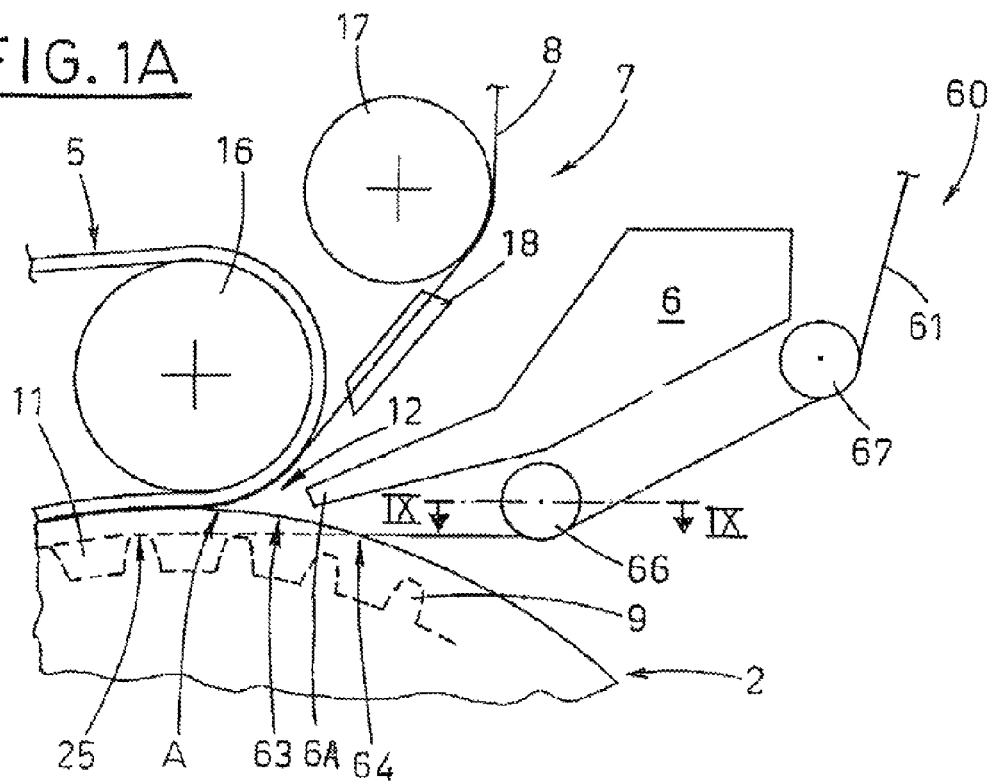
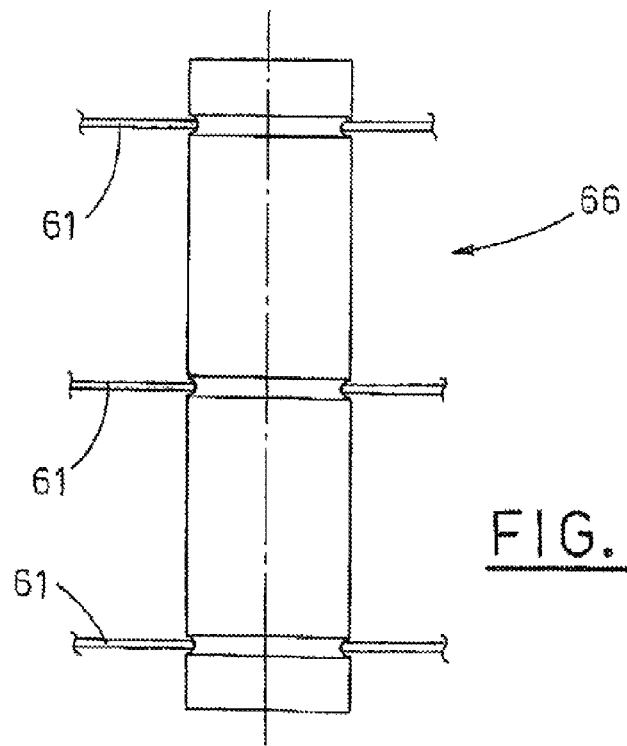

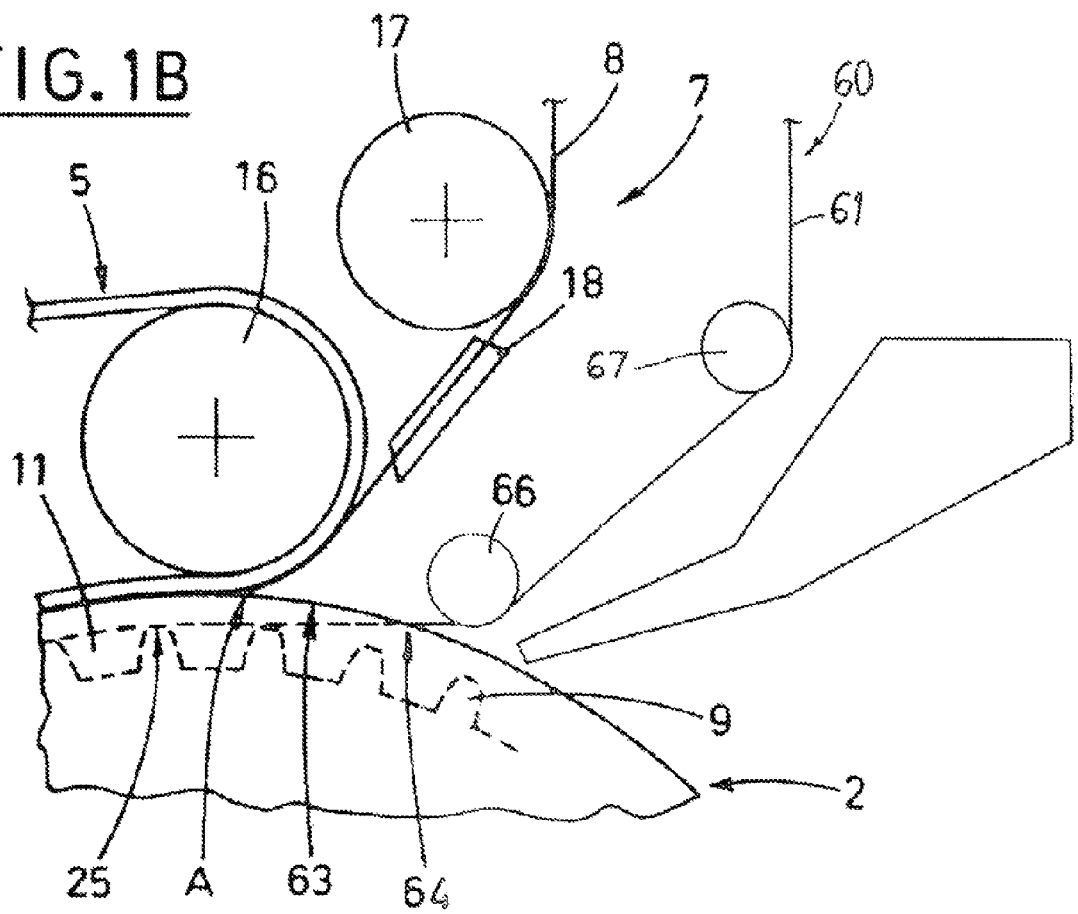

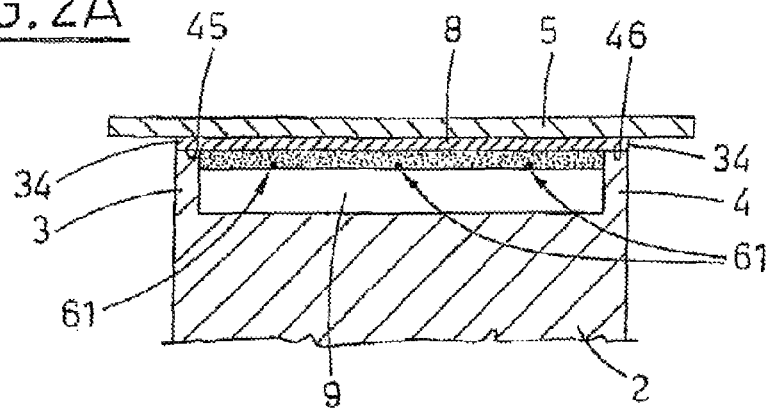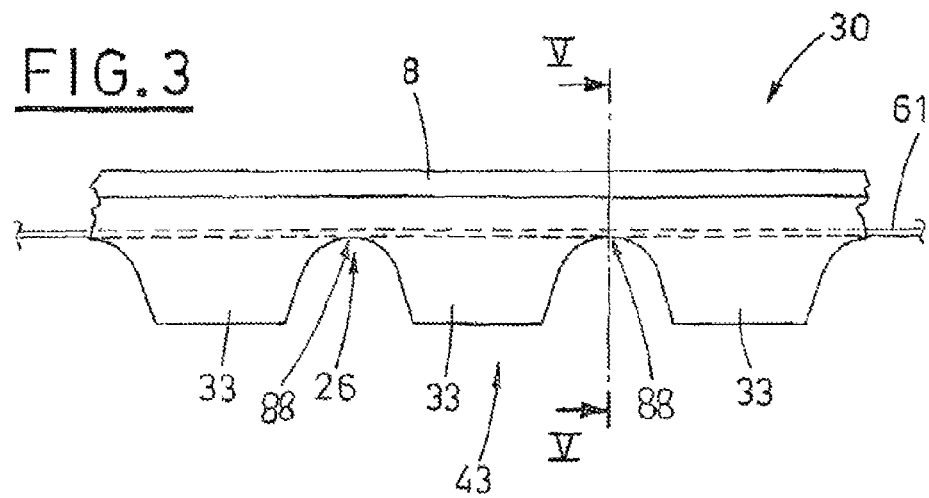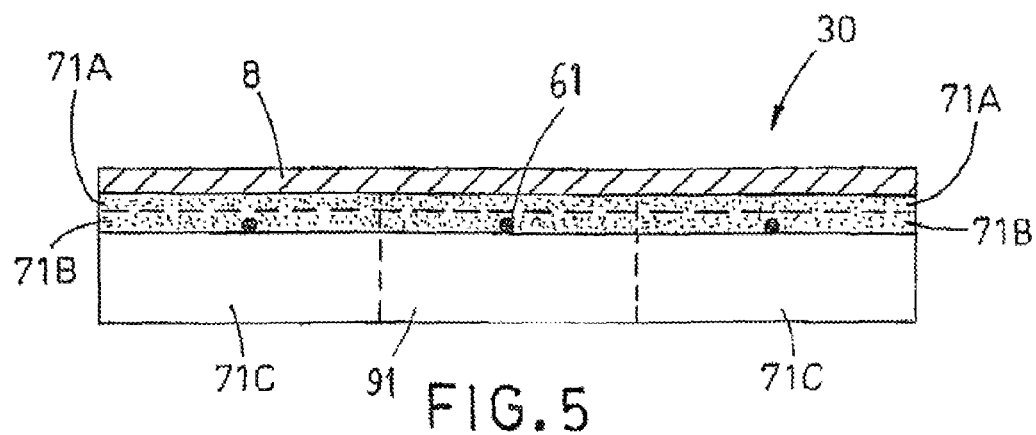

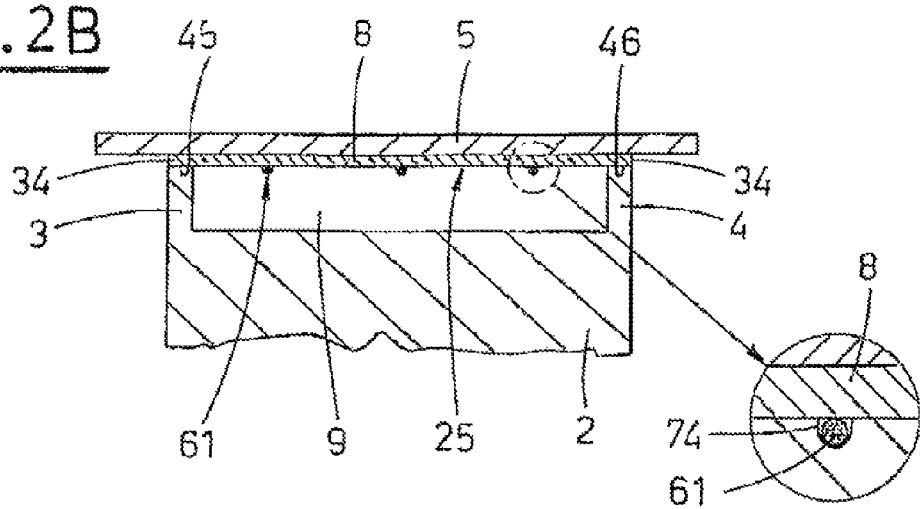
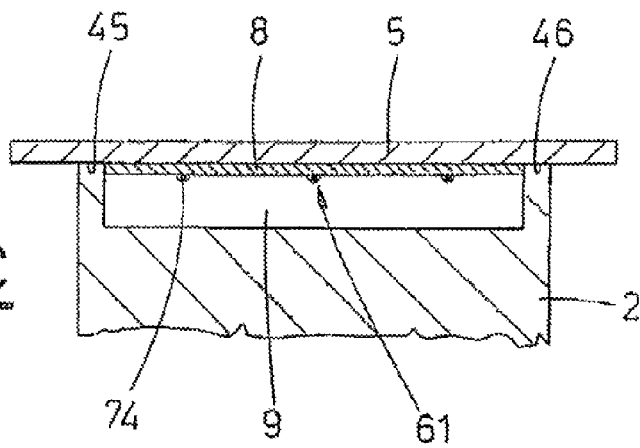
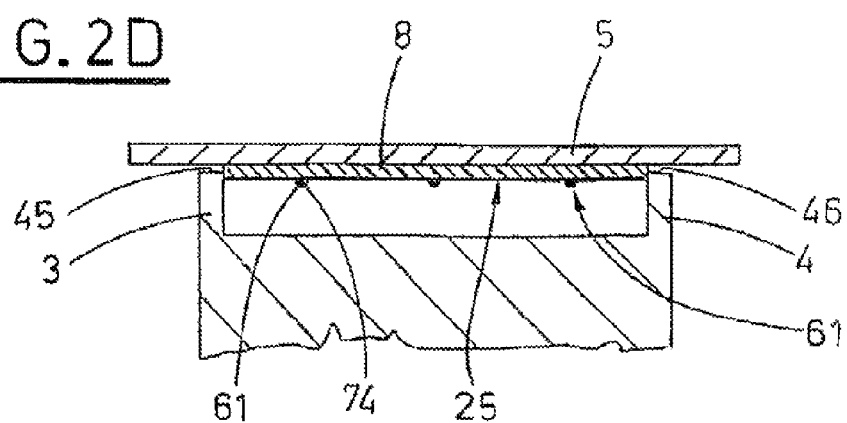

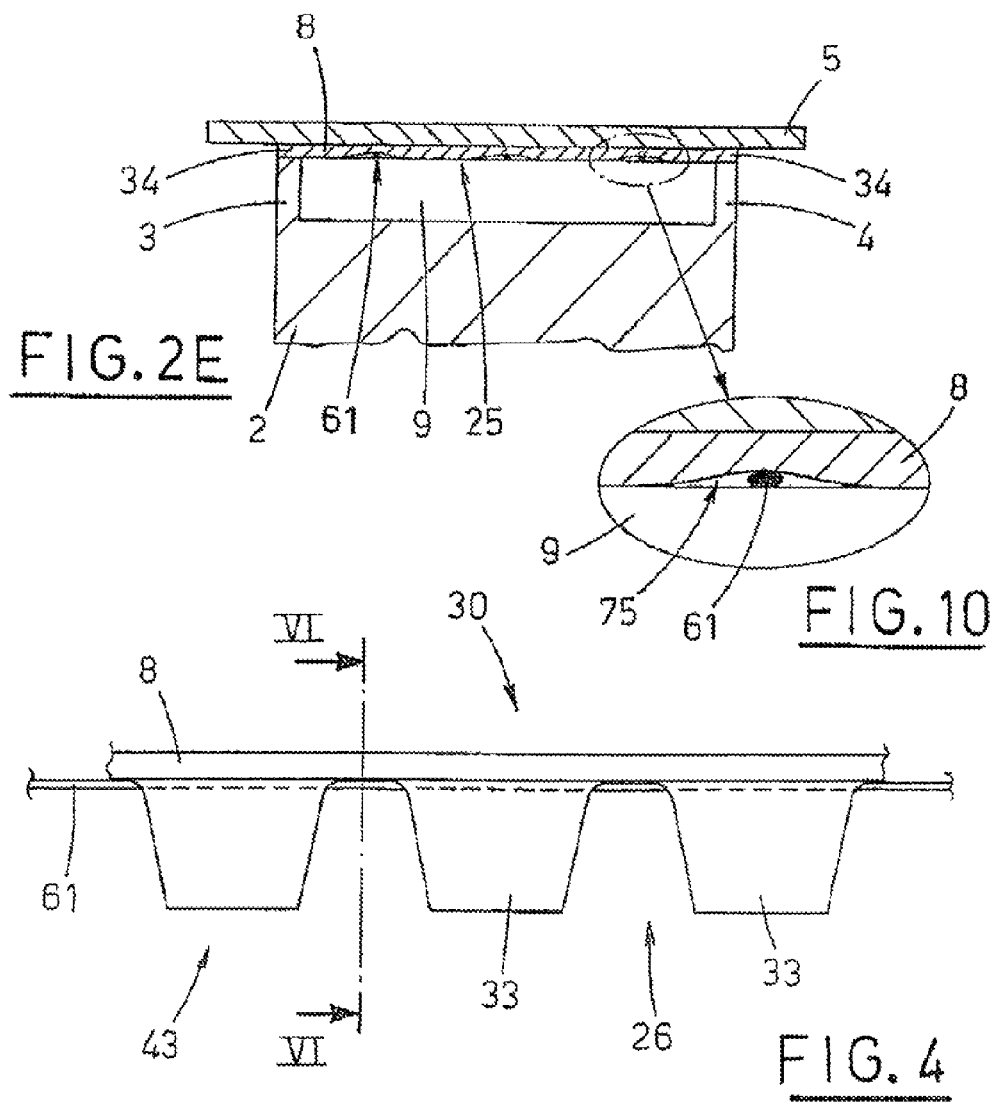
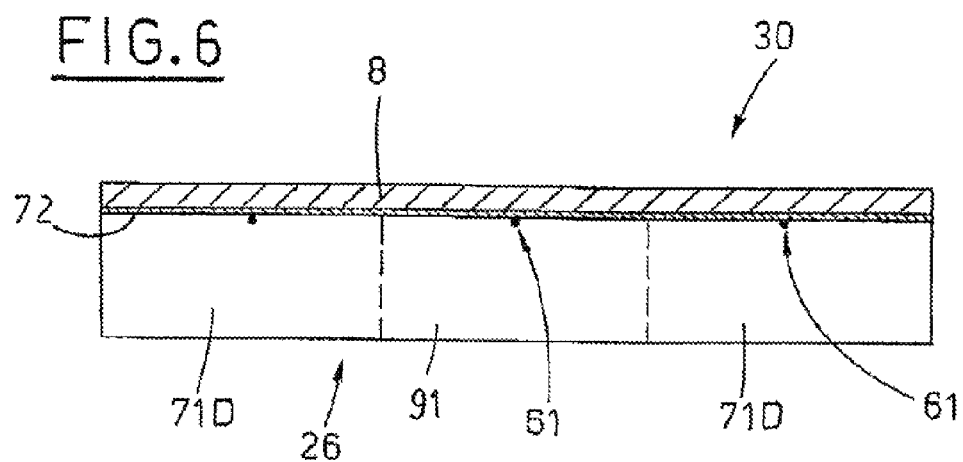

COGGED BELT FOR CONVEYING ARTICLES AND/OR FOR POWER TRANSMISSION, AND A METHOD AND AN APPARATUS FOR REALISING THE COGGED BELT

TECHNICAL FIELD

The invention relates to the technical sector of synchronised conveying and power transmission. In more detail, the invention relates to a belt provided with a cogged profile for transport of articles and/or power transmission, to a method for realising the belt and an apparatus for actuating the method.

BACKGROUND ART

The prior art comprises cogged belts manufactured in thermoplastic material in which reinforcing metal cores are sunk, arranged in a longitudinal direction and constituted by a plurality of cords or flanked filaments; the belts have high resistance to traction and are thus suitable for power transmission and synchronised transport of articles; in their disfavour, they are expensive and rigid.

Where transport of articles does not require high power mechanisms, for example in some applications in the food industry, homogeneous belts are used (for example made entirely of a thermoplastic material) which are flat, i.e. they have a constant thickness along the transversal development thereof, and on which one or more longitudinal centring guides can be additionally applied, either continuous or cogged; the centring guides are destined to engage in corresponding annular gullies (respectively hollow or cogged) afforded in the driven and drive pulleys on which the belt is destined to wind. These belts exhibit a greater flexibility inasmuch as they are not provided with reinforcement cores, so that they can wind on pulleys of smaller diameter, but their low mechanical resistance limits their range of application.

Italian patent no. 1,170,292 describes a process and a device for manufacturing a reinforced cogged belt, i.e. with metal reinforcing cores.

The device comprises: a rotating support wheel activated in rotation by actuator organs, on a periphery of which an annular gully is afforded; a containment cover (for example a ring-wound belt) which faces a circular sector of the rotatable wheel to form a hollow chamber exhibiting an inlet section with respect to a rotation direction of the wheel; a ring-shaped member provided with an external cogging, which member winds about the rotatable wheel and about a driven wheel engaging with the relative base in the annular gullies of both the wheels (drive and driven); and an extrusion nozzle arranged at the inlet section of the hollow chamber, destined to inject molten plastic material on the cogged shape.

A metal reinforcing cord is previously spiral-wound on the ring-shaped cogging, ends of which cord are fixed to the cogging itself.

The molten plastic material on the cogging and retained by the walls of the gully of the rotating support wheel and by covering solidifies during transit along the hollow chamber; thus a length of reinforced cogged belt is formed, a head end of which is subsequently joined to the tail end thereof at the inlet section of the hollow chamber by release of a molten thermoplastic material from the extrusion nozzle, thus obtaining a ring-wound belt.

With suitable adaptation, continuous reinforced cogged belts can be obtained; alternatively, by removing the use of a reinforcing cord, it is possible to obtain cogged ring-wound belts or continuous cogged ring-wound belts made entirely of a thermoplastic material.

DISCLOSURE OF INVENTION

In the light of the above, the aim of the present invention consists in providing a new type of product provided with a cogged profile for transport of articles and/or for transmission of power, which is different to the above-described belts of known type, due to the fact that it exhibits intermediate characteristics of resistance, flexibility, non-extensibility with respect to the characteristics of cogged belts having a reinforcing core, on the one hand, and flat belts or belts provided with longitudinal guides, on the other hand.

In particular, a new type of product is provided for the sector of reference, which exhibits improved characteristics of resistance and non-stretchability in comparison with conventional belts of the flat type or provided with longitudinal guides, as explained herein above.

A further aim of the present invention consists in providing a method for realising the product which is provided with a cogged profile, as mentioned herein above.

A still further aim of the present invention consists in providing an apparatus for realising the product provided with a cogged profile, as mentioned herein above.

The above aims are obtained with the contents of independent claims 1, 14, 20 in relation to: a cogged belt (claim 1) for transport of articles and/or for transmission of power; a method (claim 14) for realising a cogged belt for transport of articles and/or for transmission of power; and an apparatus (claim 20) for realising a cogged belt for transport of articles and/or for transmission of power.

In agreement with claim 1, the cogged belt for transport of articles and/or for transmission of power comprises: a prefabricated belt comprising a textile or a meshed net; and a covering made of a thermoplastic or heat-hardening material, fixed in a single body by fusion to the prefabricated belt in order substantially to entirely cover a side of the belt, forming a cogged profile.

In agreement with claim 14, the method is of a type using a mould which is mobile in an advancing direction, which exhibits a longitudinal development and comprises a succession of spaces for containment of a molten thermoplastic or heat-hardening material, the method being characterised in that it includes following operational stages which occur contemporaneously to one another: supplying a prefabricated belt to a first transit section of the mould, such that the prefabricated belt faces the spaces, advancing at a same speed as the mobile mould; and supplying molten thermoplastic or heat-hardening material into the spaces of the mould at a second transit section arranged upstream of the first transit section with respect to the advancing direction, a quantity of the molten thermoplastic or heat-hardening material contained in the spaces and the relative arrangement of the prefabricated belt realising a mutual contact between the molten thermoplastic or heat-hardening material contained in the spaces and the prefabricated belt in order to enable a formation of a single body comprising the prefabricated belt and a covering applied thereto and constituted by the thermoplastic or heat-hardening material when solidified.

In agreement with claim 20, the apparatus is characterised in that it comprises: a pulley which is activatable in rotation by actuator organs, peripherally conforming a cogged profile; two lateral edges fixed respectively to the opposite heads of the pulley for the lateral delimitation of spaces identified by the cogged profile; a mobile contrast belt having a tract facing a circular sector of the pulley in order to identify, in combination with the pulley, a channel having an inlet section and an outlet section with respect to the rotation direction of the pulley; first means for supplying a prefabricated belt internally of the channel through the inlet section, arranged such that: the prefabricated belt is sandwiched between the contrast belt and the external contact profiles of the pulley and/or the lateral edges; and consequently the belt is drawn along the channel by effect of the activation of the pulley; and second means for supplying molten thermoplastic or heat-hardening material into the spaces of the pulley in a sufficient measure for realising the mutual contact between the molten thermoplastic or heat-hardening material destined to be contained therein and the prefabricated belt in order to enable formation of a single body comprising the prefabricated belt and a covering applied to the belt and constituted by the thermoplastic or heat-hardening material when solidified.

The advantage of the present invention consists in having defined a belt which is provided with a cogged profile (also referred-to in the following as a cogged belt) for synchronised transport applications of articles and/or power transmissions, which fully satisfies the set aims.

With respect to convention flat belts, or belts provided with one or more longitudinal guides, the cogged belt of the invention exhibits: advantageously a greater resistance to traction and thus a greater transmittable power thanks to the presence of the cogged covering which substantially entirely covers a side of the prefabricated belt; and a flexibility and inextensibility which are almost unchanged. With respect to thermoplastic belts in which steel longitudinal reinforcement cores are sunk, the cogged belt of the invention exhibits: advantageously a greater flexibility, such as to enable winding about small-diameter pulleys; on the other hand, it has a smaller resistance to traction and a greater extensibility.

The cogged belt thus obtained advantageously exhibits technical-functional characteristics which are distinct with respect to belts of known type; the limited cost of realisation as well as the optimal flexibility and mechanical resistance make this new type of product, object of the present invention, usable in a great number of industrial applications, for example those where the cogged belt is destined to be wound on smaller-diameter resources.

Obviously a whole series of correlated technical-functional advantages follow on from the possible reduction of diameters of the pulleys on which the cogged belt is destined to wind, such as a reduction in weight, sizes, and thus also costs of the corresponding conveyor organ on which the cogged belt winds.

A further advantage of the present invention consists in having defined a method and an apparatus for realising the above-described cogged belt for the synchronised transport of articles and/or for the transmission of power, in accordance with the predetermined aims.

BRIEF DESCRIPTION OF THE DRAWINGS

Some specific embodiments of the invention, and technical-functional characteristics correlated to the embodiments, will be described in the following description, which is in agreement with the contents of the claims and which is described with the aid of the accompanying figures of the drawings, in which:

FIG. 1A is the enlarged detail K of FIG. 1;

FIG. 1B is a similar enlarged detail of FIG. 1, but in a variant thereof;

FIGS. 2A, 2B, 2C, 2D, 2E are an enlarged scale representation of views along section II-II of FIG. 1 with the use of a variable-dimension prefabricated belt and a cogged-pulley-containing lateral edge assembly having a different geometry and conformation;

FIGS. 3 and 4 show, in enlarged scale with respect to FIG. 1, lateral and partial schematic views of the cogged belts, also an object of the invention, obtained using the apparatus of the first embodiment, with the technical-functional details of FIGS. 2A-2E;

FIG. 5 is the view of section V-V of FIG. 3;

FIG. 6 is the view of section VI-VI of FIG. 4;

FIG. 8 is a view of an enlarged detail of FIG. 2B;

FIG. 9 is a view of an enlarged detail of section IX-IX of FIG. 1C;

FIG. 10 is a view of an enlarged detail of FIG. 2E;

BEST MODE FOR CARRYING OUT THE INVENTION

Figure 1:
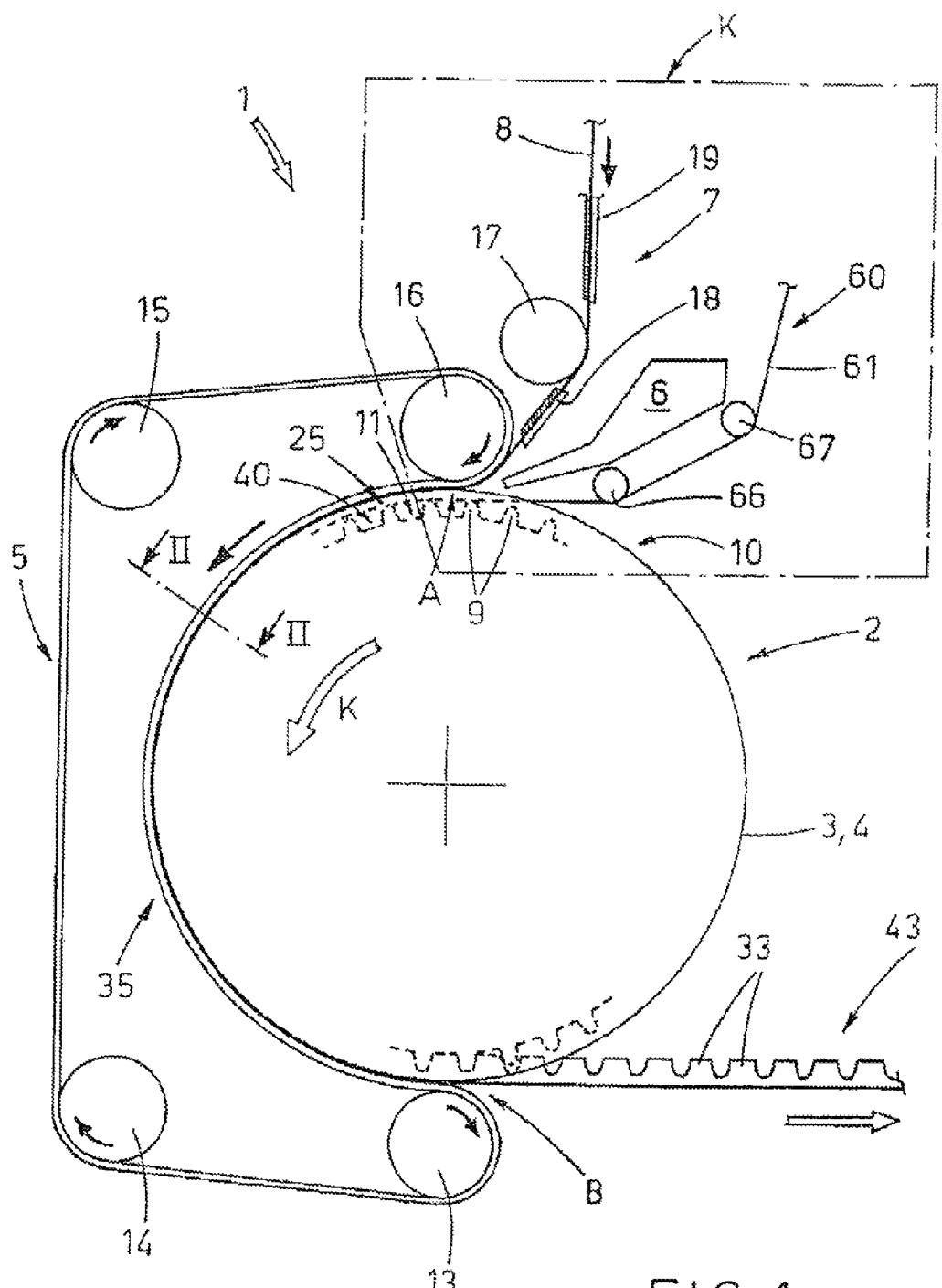
FIG. 1 illustrates a schematic lateral view of the apparatus of the present invention, in a first embodiment thereof.

With reference to FIGS. 1, 1A, 2A-2E, 3-6, 8-10, 1 denotes in its entirety the apparatus of the invention for realising, for example continuously, a cogged belt, also an object of the invention, which apparatus 1 comprises a cogged pulley 2 peripherally forming a cogged profile 40, a contrast belt 5, a device 6 for supplying a molten thermoplastic or heat-hardening material, a first station 7 for supplying a prefabricated belt 8 and a second station 60 for supplying a plurality of reinforcing cores 61 that develop longitudinally, and are for example cord-shaped.

The cogged pulley 2 is drawn continuously in rotation by actuator organs, not illustrated, and is provided with two lateral containment edges 3, 4 which are opposite one another and removably fixed to the respective heads, for identifying a seating or circular mould 10 for receiving the molten thermoplastic or heat-hardening material. The lateral edges 3, 4 can project with respect to the extract contact profiles 25 of the cogs 9 of the pulley 2 (as in FIGS. 2A, 2C, 2D), or can be substantially aligned to the contract profiles 25 (as in FIGS. 2B and 2E); it follows that the circular mould 10 will be defined by spaces 11, which are delimited by contiguous pairs of cogs 9, by the lateral edges 3, 4, and are respectively communicating to one another, or are separated from one another.

The contrast belt 5 ring-winds about corresponding driven pulleys 13, 14, 15, 16 and is made of a material having a limited yield, for example metal; it exhibits an active tract 35 facing a circular sector of the cogged pulley 2, and in non-operative positions it faces the external contact profiles 45, 46, 25 of the group formed by the cogged pulley 2 and the lateral edges 3, 4, identifying, in combination with the group, a channel 12 which exhibits an inlet section A (which in the following and in the claims will also be termed the first transit section A) and an outlet section B with respect to the rotation direction K of the cogged pulley 2.

In the example of FIGS. 1, 1A, the supply device 6 is arranged in proximity of the inlet section A of the channel 12; the exit nozzle or mouth 6A of the supply device 6 continuously releases molten thermoplastic or heat-hardening material into the circular mould 10 at a second transit section 63 thereof, arranged (see in particular FIG. 1A) upstream of the first transit section A with respect to the advancement direction K.

The first station 7 is arranged in the vicinity of the inlet section A of the channel 12, and supplies a prefabricated belt 8 (for example substantially of the type mentioned in the first part of this description) at the inlet section A or first transit section of the mould 10. The first station 7 is arranged, with respect to the contrast belt 5, the cogged pulley 2 and the lateral edges 3, 4, such that the prefabricated belt 8 is gripped between the contrast belt 5 and the external contact profiles 45, 46, 25 of the cogged pulley 2 and/or the lateral edges 3, 4. In particular the prefabricated belt 8 is pressed by the contrast belt 5: against the edges 45, 46 of the lateral edges 3, 4 (FIG. 2A); against the external contact profiles 25 of the cogs 9 of the cogged pulley 2 (FIGS. 2C, 2D); or against the edges 45, 46 of the lateral edges 3, 4 and against the external contact profiles 25 of the cogs 9 of the cogged pulley 2 in a case of reciprocal alignment of the external contact profiles 45, 46, 25 (the solution shown in FIGS. 2B, 2E). In the illustrated example of FIG. 1, the prefabricated belt 8 can unwind from a reel (not illustrated) and be guided by means of the pulleys 16, 17 and the guide elements 18, 19 to correctly insert the prefabricated belt 8 internally of the channel 12.

By way of example, the prefabricated belt 8 comprises, or is solely constituted by, a textile or a large-mesh net; it is permeable or impermeable to the molten thermoplastic or heat-hardening material; and finally comprises, or is solely constituted by, one or more materials selected from the following group: polyester, nylon, glass fibre, Kevlar®.

The second station 60 is arranged in the vicinity of the inlet section A of the channel 12 and supplies into the mould 10 a plurality of reinforcing cores 61 having longitudinal development (for example three in the accompanying figures of the drawings), for example cord-shaped, at a third transit section 64 arranged upstream with respect to the first A and the second 63 transit section with respect to the rotation direction K of the cogged pulley 2, such that a part of the molten thermoplastic or heat-hardening material released by the device 6 falls onto the reinforcing cores 61 and then drops into the spaces 11; as in FIG. 1A, the reinforcing cores 61 slide below the nozzle 6A of the device 6.

As will become clear in the following part of the description, the reinforcing cores 61 are destined to house in corresponding channels 74 afforded in the cogs 9 of the cogged pulley 2 (FIGS. 2B, 2C, 2D), or simply to rest on the external contact profiles 25, of the cogs 9 of the cogged pulley 2 (FIGS. 2A, 2E), staying at a predetermined distance from one another. The reinforcing cores 61 unwind, for example, from corresponding reels, not shown in the figures, and are guided by grooved rollers 66, 67, of known type (FIGS. 1, 1A, 9).

Each reinforcing core 61 exhibits a very limited thickness, for example comprised between a third and a tenth with respect to the thickness of the prefabricated belt 8, is flexible, resistant and has limited extensibility, which extensibility is in any case less than that of the solidified thermoplastic or heat-hardening material released by the supplying device 6 and at most is the same as that of the material the prefabricated belt 8 is made of (according to the composition thereof); in addition, the reinforcing core 61 can exhibit any shape (for example, cylindrical, having a cord shape) and can be realised using the materials which time-by-time are held to be more suitable for its characteristics of resistance, flexibility and inextensibility, in particular carbon, steel, silicon, Kevlar®. The characteristics of the reinforcement cores 61 also permit a partial crushing during the formation of the cogged belt, as will become clear during the present description.

During regular functioning of the apparatus 1, the prefabricated belt 8 arranged internally of the channel 12 is gripped between the contrast belt 5 and the cited external contact profiles 45, 46, 25 of the cogged pulley 2-lateral edge 3, 4 group, as described herein above. The contrast belt 5 is moved by effect of the friction coupling of the relative active tract 35 with the prefabricated belt 8, which in turn is drawn by the cogged pulley 2; the contrast belt 5 is activated at a same velocity as the peripheral velocity of the cogged pulley 2. Alternatively, the contrast belt 5 can be subjected to actuator organs (for example the organs which activate the cogged pulleys 2), not illustrated, at the same operating velocity as the cogged pulley 2, with the aim of preventing possible dragging of the contrast belt 5 and the cogged pulley 2 against the prefabricated belt 8.

The functioning of the apparatus 1 of the invention further defines a corresponding method for realising the cogged belt, which method is also an object of the present invention and includes the following operating stages, which occur contemporaneously with one another:

supplying the prefabricated belt 8 at the first transit section A of the mould 10 internally of the channel 12 such that the prefabricated belt 8 is in contact with the mould 10, faces the spaces 11 and is drawn at the same velocity as the mobile mould 10;

supplying the molten solidified thermoplastic or heat-hardening material into the spaces 11 of the mould 10 at the second transit section 63 in such quantities as to realise a successive mutual contact between the molten solidified thermoplastic or heat-hardening material contained in the spaces 11 and the prefabricated belt 8;

and supplying the plurality of reinforcing cores 61 at the third transit section 64, such that the reinforcing cores 61 go into contact against the external profiles 25 of the cogs 9 of the mould 10, advancing at the same velocity as the mobile mould 10.

Exiting from the channel 12 (outlet section B) a cogged belt 30 is identified, comprising the prefabricated belt 8, the cogged covering 26 made of a molten solidified thermoplastic or heat-hardening material applied to the prefabricated belt 8 and the reinforcing cores 61 sunk into the cogged covering 26; the covering 26 forms a cogged profile 43 identified by a cogged succession 33. The composition and shape of the cogged belt 30 depend respectively on the type of the prefabricated belt 8 (relative to the material and the permeability, see the above) and on the characteristics of the cogged pulley 2-lateral edge 3, 4 group; in the following only some of the possible combinations of characteristics distinguishing the cogged belt 2-lateral edge 3, 4 group will be described by way of example with reference to FIGS. 2A-2E; other combinations, although not directly mentioned, are understood to fall within the ambit of protection of the present invention, in agreement with the contents of the claims.

With reference to FIG. 2A, the lateral edges 3, 4 project with respect to the external contact profiles 25 of the cogs 9 of the pulley 2, while the prefabricated belt 8, constituted by impermeable material (e.g. a textile) or a permeable material (e.g. a net or a large-mesh textile), is gripped between the edges 45, 46 of the lateral edges 3, 4 and the active tract 35 of the contract belt 5. The reinforcing cores 61 are simply resting on the external contact profiles 25 of the cogs 9 of the cogged pulley 2 (i.e. on the upper contact portions of the cogs 9), and are sunk into the thermoplastic or heat-hardening material contained in the mould 10; the reinforcing cores 61 however stay distanced from one another, from the moment of release from the grooved guide rollers 66, 67 and for the whole forming of the cogged belt 30, which occurs internally of the channel 12. The cogged belt 30 thus obtained has been shown in a schematic lateral view in FIG. 3 and in transversal section in FIG. 5, where the reinforcing cores 61 are almost completely sunk into the thermoplastic or heat-hardening material of which the cogged covering 26 is composed.

However, in the spaces between a cog 33 and another cog 33 of the covering (FIG. 3) corresponding tracts 88 of the reinforcing cores 61 can be identified, in the example very limited, not covered by the solidified thermoplastic or heat-hardening material; these tracts 88 of the reinforcing cores 61 are in particular those which were in contact with the profiles 25 of the cogs 9 during the forming of the cogged belt 30 internally of the channel 12.

The cogged covering 26 applied to the prefabricated belt 8 exhibits a thickness which is defined by a difference in height between the edges 45, 46 of the lateral edges 3, 4 and the external contact profiles 25 of the cogs 9; consequently, the choice of the type of lateral edge 3, 4, as mentioned blocked preferably removably to the cogged pulley 2, enables a regulation according to needs to be made of the thickness of the cogged covering 26 of the cogged belt 30 to be obtained. In the case of a prefabricated belt 8 made of a permeable material, the molten thermoplastic or heat-hardening material has such a viscosity that it expands internally of the prefabricated belt 8, without however exiting externally thereof; the prefabricated belt 8 can be sunk totally or in part in the thermoplastic or heat-hardening material.

With reference to FIGS. 2B, 2E, the lateral edges 3, 4 are aligned to the external contact profiles 25 of the cogs 9 of the pulley 2, and the prefabricated belt 8 is thus gripped between the edges 45, 46 of the lateral edges 3, 4 and the external profile contact profiles 25, on the one hand, and the contrast belt 5 on the other. The reinforcing cores 61 are housed internally of the respective grooves 74 (FIG. 2B) or simply rest on the contact profiles 25 of the cogs 9 of the cogged pulley 2 (FIG. 2E); in the last case the reinforcement cores 61 locally deform (and elastically) corresponding portions 75 of prefabricated belt 8 which they are directly in contact, elastically deforming in turn.

The cogged belt 30 thus obtained is illustrated in a schematic lateral view in FIG. 4 and in a transversal section in FIG. 6, where it can be seen that the reinforcing cores 61 are sunk into the thermoplastic or heat-hardening material which forms the cogged covering 26 only at the position of the relative cogs 33. In this case too, between one cog 33 and another of the cogged covering 26 there are tracts 88 of the reinforcing cores 61) which are uncovered by the thermoplastic or heat-hardening material; these tracts 88 are bigger than the ones illustrated with reference to the cogged belt 30 in FIG. 3, as indeed is also evident in a comparison between FIGS. 3 and 4.

A residual and slim filmy layer 72 of thermoplastic or heat-hardening material is also represented in FIG. 6 (for the sake of simplicity it is not illustrated in FIG. 4), which layer 72 solidifies on the portions of prefabricated belt 8 interposed between consecutive cogs 33 during the forming process of the cogged belt 30; in other words, the cogged covering 26 applied on the prefabricated belt 8 is constituted by a succession of cogs 33 intercalated by the filmy layer 72. In any case, the filmy layer 72 does not cover the reinforcing cores 61, which stay uncovered at the relative tracts denoted by reference number 88.

The crushing of the reinforcing elements 61 during the formation of the cogged belt 30 in no way prejudices the technical-functional characteristics thereof, which stay unchanged.

The cogged belts 30 obtained following the above-described steps exhibit, in outlet from the channel 12 (outlet section B) lateral peripheral portions 34 constituted only by the prefabricated belt 8; the peripheral portions 34 are those contacted by the edges 45, 46 of the lateral edges 3, 4 during the stage of forming the cogged covering 26 internally of the channel 12 and can easily be eliminated with a subsequent cutting-back operation on the cogged belt 30.

In FIG. 2C, the lateral edges 3, 4 project with respect to the external contact profiles 25 of the cogs 9 of the pulley 2, and the prefabricated belt 8 constituted by impermeable material (e.g. a textile) or permeable material (e.g. a net or large-mesh textile), is inserted in the circular mould 10 between the lateral edges 3, 4 and is gripped between the external contact profiles 25 of the cogs 9 and the contrast belt 5. The reinforcing cores 61 are housed, for example in the grooves 74 of the cogs 9 of the cogged pulley 2. The corresponding cogged belt 30 which is obtained is again represented in a lateral schematic view in FIG. 4 and in a transversal section in FIG. 6; the height difference between the edges 45, 46 of the lateral edges 3, 4 and the external contact profiles 25 of the cogs 9 coincides in this case with the thickness of the prefabricated belt 8.

In FIG. 2D, the lateral edges 3, 4 project with respect to the external contact profiles 25 of the cogs 9 of the pulley 2, and the prefabricated belt 8, constituted by permeable or impermeable material, is inserted only partially in the circular mould 10 between the lateral edges 3, 4 and is gripped between the external contact profiles 25 of the cogs 9 and the contrast belt 5. The corresponding cogged belt 30 obtained is as in the schematic lateral view of FIG. 4, and the transversal section of FIG. 6; in the illustrated example, the reinforcing cores 61 house in the grooves 74 of the cogs 9 of the cogged pulley 2. The height difference between the edges 45, 46 of the lateral edges 3, 4 and the external contact profiles 25 of the cogs 9 is greater than or equal to zero, and less than the thickness of the prefabricated belt 8.

The cogged belts 30 obtained following the above steps (in accordance with FIGS. 2C, 2D) do not exhibit the lateral peripheral portions 34 in outlet from the channel 12 (outlet section B), so a subsequent cutting-back operation is not required.

During normal functioning at working speed of the apparatus 1, the reinforcing cores 61 (cord-shaped in the example illustrated in the figures) unwind from the relative reel, not illustrated, by effect of the movement of the cogged pulley 2 which draws the prefabricated belt 8. The molten thermoplastic or heat-hardening material contained internally of the spaces 11 of the cogged pulley 2, as it progressively solidifies constrains the reinforcing cores 61 in a single body to the prefabricated belt 8, such that the reinforcing cores 61 are unwound at the same velocity as the cogged belt 2. On apparatus start-up, it is possible for example to constrain the head ends of the reinforcing core 61 to the cogged pulley 2, such as to guarantee drawing thereby; with the formation of the cogged belt 30, the reinforcing cores 61 are constrained to the prefabricated belt 8 by fusion of the thermoplastic or heat-hardening material and working speed is immediately reached, which guarantees correct drawing of the reinforcing cores 61.

The additional presence of the reinforcing cores 61 advantageously gives the cogged belt 30 a greater resistance to traction and thus a higher transmittable potential; flexibility remains more or less unchanged, thanks to the use of cord-shaped reinforcing cores 61 realised with special materials, such as in particular polyester, nylon, glass fibre, Kevlar®.

A further advantage connected to the use of the reinforcing cores 61 is the fact that the cogged belt 30 is overall less extensible, and can therefore be easily mounted on drive and driven pulleys without any risk of damage or breakage to the cogged belt itself, i.e. any compromising of the enmeshing between the cogs 9 and the cogged pulleys.

The cogged belt 30 of the present embodiment solves a known drawback of conventional flat-type belts or belts provided with one or more longitudinal guides; as the latter are particularly extensible, they can be wrongly mounted on the drive pulleys and the driven pulleys by the operators, who tension them excessively and damage them; additionally, if the conventional belts exhibit a cogged guide for applications of a synchronous step-type, an excessive traction of the belt during mounting could lead to a percentage lengthening thereof which would be such as to compromise correct enmeshing between the cogged guide and the cogging fashioned on the pulleys it winds on, with possible damage ensuing.

The cogged belt 30 provided with reinforcing cores 61 advantageously exhibits characteristics of resistance and non-stretchability which are entirely similar to those of cogged belts made of thermoplastic or heat-hardening material provided with reinforcing cores made of steel, but it has the advantage of possessing greater flexibility, comparable to that of conventional-type belts described in the first part of the present document.

In addition, with a same thickness and type of prefabricated belt 8, and a same type and number of reinforcing cores 61, the degree of flexibility of the cogged belt 30 can be "modulated" by correctly dimensioning the cogged pulley 2-lateral edge 3, 4 group, to obtain a cogged belt 30 having a thermoplastic or heat-hardening material covering 26 having whatever thickness. With reference to FIG. 4, for example, the covering 26 made of thermoplastic or heat-hardening material is constituted by a succession of cogs 33 alternated by the filmy layer 72.

A further advantage of the above-described embodiment consists in having defined a method and an apparatus for realising a cogged belt which is provided with cord-shaped reinforcing cores for synchronised transport applications of articles and/or for power transmissions, which fully achieves the preset aims.

FIG. 1B illustrates the apparatus of the invention in a variant form thereof, which includes an arrangement of the supply device 6 at the second supply station 60 which is such that the molten thermoplastic or heat-hardening material released by the device 6 drops directly internally of the spaces 11 of the mould 10 without even a part of the material dropping onto the reinforcement cores 61.

In the illustrated example of FIG. 1B, the supply device 6 is arranged upstream of the second supply station 60; in other words, the third transit section 64 is arranged downstream of the second transit section 63 with respect to the rotation direction K of the cogged pulley 2.

For this variant there is a also corresponding method for realising the cogged belt 30 provided with reinforcing cores 61, which comprises the same operating steps as described above with reference to the first embodiment.

The advantages of the variant illustrated in FIG. 1B are many, and can be described through a comparison with the first embodiment as described herein above.

In the first embodiment, it is necessarily first to heat the reinforcing cores 61 to a temperature close to that of the molten thermoplastic or heat-hardening material destined to drop in part above before falling internally of the spaces 11 of the mould 10 during the forming process of the cogged belt 30; in this way the molten thermoplastic or heat-hardening material runs onto the reinforcing cores 61 without prematurely solidifying.

The heating of the reinforcing cores 61 is necessary in particular when the reinforcing cores 61 are considerable in number and arranged close to one another; in any case, the step in which the reinforcing cores 61 are arranged in relation to one another is however limited to a lower limit value in order to enable the passage of the molten thermoplastic or heat-hardening material internally of the spaces 11 of the mould 10.

The fact of directly dropping the molten thermoplastic or heat-hardening material directly into the spaces 11 of the mould 10 advantageously saves the energy required for heating the reinforcing cores 61 and significantly lowering the above-mentioned lower limit value, so as to obtain cogged belts 30 which comprise a greater number of reinforcing cores 61 and thus are characterised by a still greater resistance to traction.

A further advantage linked to the variant of the FIG. 1B relates to the type of cogged belts 30 obtained, which exhibit reinforcing cores 61 which are completely sunk into the thermoplastic or heat-hardening material which constitutes the cogged covering 26 (this solution is not illustrated in the figures); this is particularly advantageous where the cogged belts operate in particularly moist environments (e.g. some food industry applications) which might attack the intrinsic characteristics of the reinforcing cores if these were not completely sunk into the thermoplastic or heat-hardening material of the covering 26.

In the first embodiment, however, tracts 88 exist (FIGS. 3, 4 relating to the first embodiment) which are not covered by the thermoplastic or heat-hardening material.

Figure 11:
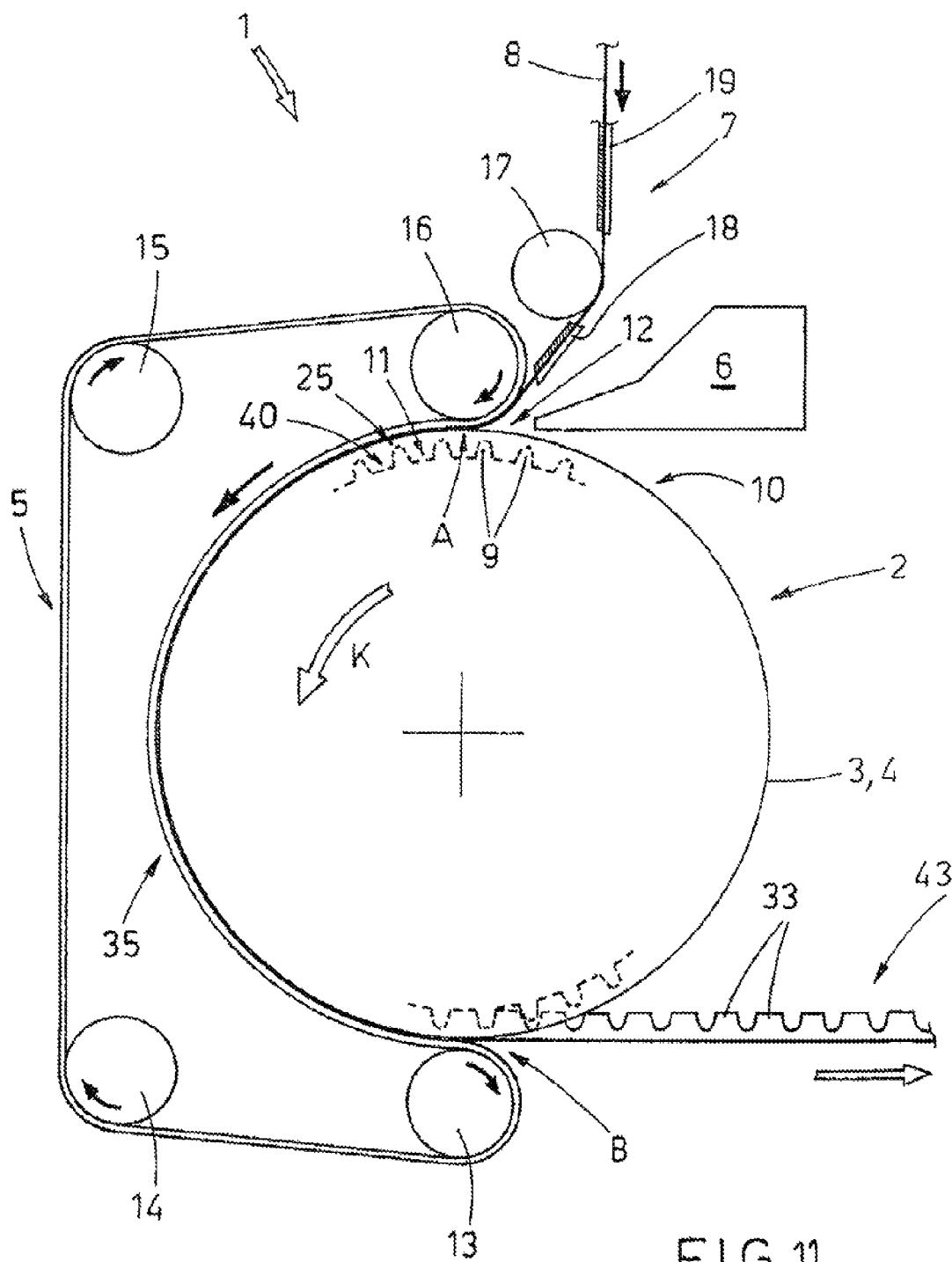
FIG. 11 illustrates a schematic lateral view of the apparatus of the present invention, in a further embodiment.

A still further embodiment of the invention is illustrated in FIG. 11, in which the apparatus is without the second station 60 for supplying the reinforcing cores 61. The cogged belt obtained is substantially the same as the one illustrated in FIGS. 3, 4 but without the reinforcing cores 61.

For this variant the above description of the first embodiment can be considered to be similar, relating to the cogged belt 30 and the apparatus and method for obtaining the cogged belt 30.

The advantages of this variant are the same as those reported in the summary of the invention.

A further variant is described herein below with reference to FIGS. 7A, 7B.

Figure 7A:
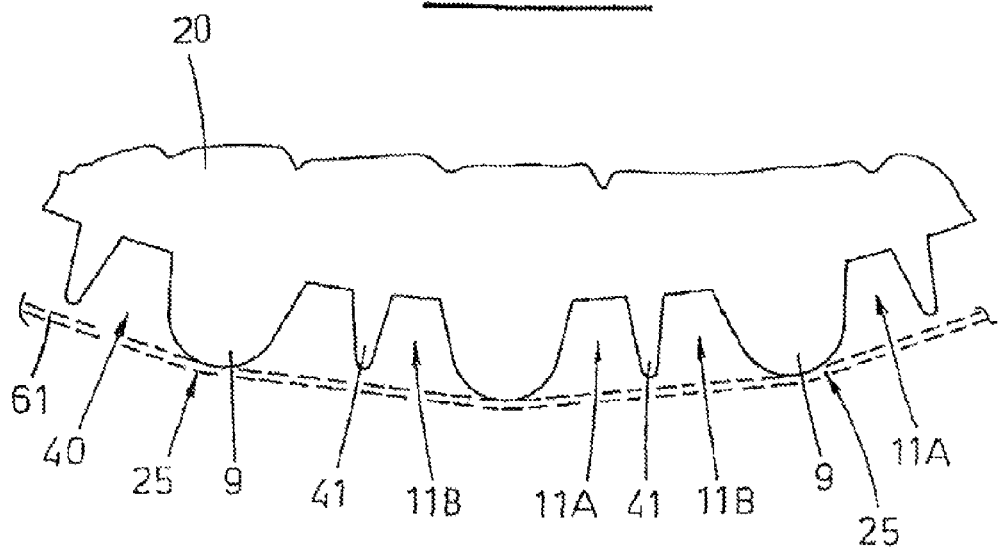
FIGS. 7A, 7B are partial views of corresponding details in enlarged scale of FIG. 1, respectively of the drive pulley and the cogged belt obtained, in a further variant of the invention; in particular FIG. 7A has been shown tilted in order to illustrate in better detail the relation which links the cogged pulley-lateral edges group with the cogged belt obtained with the further variant.
Figure 7B:
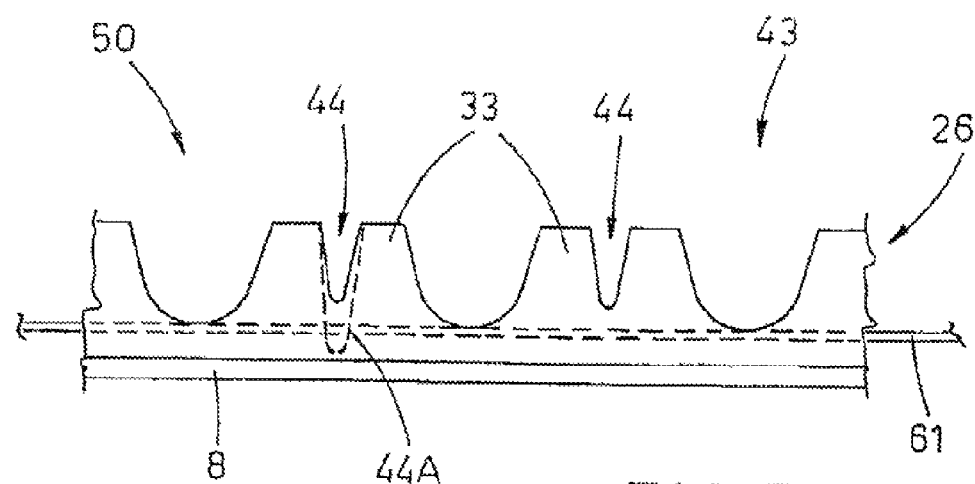

This variant relates to a special conformation of the cogged pulley 20, which is distinguished from the cogged pulley 2 described above with reference to the other embodiments (see in particular FIGS. 1, 1B, 11) in that one or more prominences, or secondary cogs 41 are provided, which secondary cogs 41 are generally smaller than the primary cogs 9; in the illustrated example of FIG. 7A the cogged pulley 20 has, between each pair of adjacent primary cogs 9, a prominence 41 such that the cogged profile 40 of the cogged pulley 20 is a regular succession of primary cogs 9 and a regular succession of prominences 41 intercalated between the primary cogs 9.

In the illustrated example, each prominence 41 exhibits the following characteristics: it has a thickness which, measured in a circular direction along the development of the pulley 20, is smaller than that of a primary cog 9; it develops to a height which exceeds by at least twice the relative mean thickness measure in a circular direction along the pulley 20, thus exhibiting an elongate shape; and it develops for a height which is less than the height of a primary cog 9.

The cogged belt 50 which is obtained with the use of this special cogged pulley 20 is different from the cogged belt obtained in the other embodiments as described above: the cogs 33 of the cogged belt 50 thus obtained exhibit in the central portion thereof an notch 44 having a complementary shape to that of the prominence 41 which has produced it. The presence of the notches 44 advantageously increases the flexibility of the cogged belt 50 overall and does not in any way compromise the enmeshing of the cogs 33 for example with a cogged winding roller.

The presence of the notches 44 has therefore the function of overall increasing the flexibility of the cogged belt 50. It is stressed that FIG. 7A shows only an example of a possible cogged pulley 20 for achieving the objective of increasing the flexibility of the cogged belt 50. By way of example it would be possible to have: one or more prominences 41 interposed between pairs of adjacent primary cogs 9; a random and non-ordered arrangement of prominences 41 between the primary cogs 9 (for example by not having any prominences 41 present between some pairs of primary cogs 9, while in others there might be one or more than one); different shapes of prominences 41. All these combinations add, in various ways, to increasing the overall flexibility of the cogged belt 50.

The cogged pulley 20 of the present variant is usable in combination with the embodiments of the apparatus and the method described above, which are objects of the invention. FIG. 7A illustrates, in a broken line, the reinforcement cores 61, clarifying that it is possible to integrate the cogged pulley 20 both for actuating the embodiment of FIGS. 1, 1B, as well as for actuating the embodiment illustrated in FIG. 11. Similar considerations are valid with reference to FIG. 7B concerning the presence or not of reinforcement cores 61; FIG. 7B also illustrates, in a broken line, an notch 44A, obtainable in the case of using one or more prominences 41 in the cogged pulley 20, which prominences 41 are higher than the primary cogs 9.

The method of the invention, described in all the above-reported variants, can additionally include a final operating stage of removing determined longitudinal portions of the cogged belt 30, 50, for example of the covering 26 and some reinforcing cores 61; the removal is done at a fourth outlet section B of the channel 12 and using known techniques (for example: use of cutters annexed to the apparatus of the invention) which will not therefore be described.

With reference to the broken lines reported in FIG. 5, and by way of non-limiting example, the removable portions have a width and a depth which are variable and which are: those denoted by reference numbers 71C; those denoted by 71C and 71B, involving corresponding reinforcing cores 61 and the depth is substantially the same as the thickness of the covering 26. With reference to the broken lines (by way of example) of FIG. 6, the removable portions of the cogged belt 30, 50 are those denoted by reference numbers 71D, involving corresponding reinforcing cores 61 and the depth is substantially the same as the thickness of the covering 26. In the reported example, the prefabricated belt 8 is not touched.

The cogged belt obtained by the removal operation of the material possibly exhibits longitudinal portions 71A, 71B, for example flat, of the covering 26 (according to the material which has been selected for removal) and has a relative cogged profile 43 only in the central part 91. The belt is particularly suitable for enmeshing with pulleys provided with cogging only at the annular gullies afforded therein; a belt of this type thus obtained is classifiable by the expert in the field as a "belt with cogged guide" (of the type described in the introduction to the present description), by virtue of the self-centring function which it performs with respect to the pulleys in winds on.

This stage of removal of material advantageously enables modulating the degree of resistance and flexibility of the belt with cogged guide according to needs, with reference to the parts actually removed; by way of example, a belt with cogged guide obtained by removal only of the portions 71C will be more resistant but less flexible than a belt obtained by removing the portions 71B.

The method of the invention advantageously including the additional stage of removing material enables large hourly quantities of belts with cogged guides to be obtained at contained costs with respect to the procedures of known type.

It is clear that with this additional stage of removal of material it is possible to realise belts (preferably thermoplastic or heat-hardening) having even more cogged guides; for example, to realise a belt with two cogged guides it is necessary to remove the external longitudinal portions of the cogged covering 26 and also a relative central longitudinal portion (a solution which is not represented in the enclosed figures of the drawings).

The foregoing has been described by way of non-limiting example, such that any variants of a practical-applicational nature are understood to fall within the ambit of protection of the invention as described above and as claimed herein below.

The invention claimed is:

1. An apparatus for producing a cogged belt for conveying articles or for power transmission, the apparatus comprising:
   a pulley (2) activatable in rotation by actuator organs, peripherally forming a cogged profile (40);
   two lateral edges (3, 4) fixed respectively to opposite heads of the pulley (2) for laterally delimiting spaces (11, 11A, 11B) identified by the cogged profile (40);
   a mobile contrast belt (5) having a tract (35) facing a circular sector of the pulley (2), identifying in combination with the pulley (2) and with the lateral edges (3, 4) a channel (12) in which an inlet section (A) and an outlet section (B) are formed, in relation to an advancement direction (K) of the pulley (2);
   a belt dispenser (7) for supplying a prefabricated belt (8) internally of the channel (12) via the inlet section (A), the prefabricated belt being a textile or a large mesh net, with the prefabricated belt (8) being gripped between the contrast belt (5) and the external contact profiles (45, 46, 25) of the pulley (2) or the lateral edges (3, 4), the prefabricated belt being drawn along the channel (12) by rotation of the pulley (2) together with the mobile contrast belt; and,
   a molten material dispenser (6) for supplying molten thermoplastic or heat-hardening material into the spaces (11, 11A, 11B) of the pulley (2) in the channel (12) upstream of the entry of the prefabricated belt therein in a sufficient measure to fill the delimited spaces of the pulley which identify the cogged profile and to produce at the inlet section a mutual-contact between the molten thermoplastic or heat-hardening material contained therein and the prefabricated belt (8) for enabling formation of the cogged belt as a single body (30, 50) within the channel, the cogged belt comprising the prefabricated belt (8) and a covering (26) constituted by the solidified thermoplastic or heat-hardening material, the thermoplastic or heat-hardenable material solidified prior to exit of the unitary cogged belt from the channel outlet section.

2. The apparatus of claim 1, further comprising a reinforcement dispenser (60) for supplying at least one reinforcing core (61) having a longitudinal development internally of the channel (12) via the inlet section (A), to enable formation of the cogged belt additionally comprising the at least one reinforcing core (61) at least partly sunk in the thermoplastic or heat-hardening material of the covering (26).

3. The apparatus of claim 2, wherein the reinforcement dispenser and the molten material dispenser (6) are arranged in relation to each other such that the molten thermoplastic or heat-hardening material released by the molten material dispenser (6) drops directly into the spaces (11, 11A, 11B) of the pulley (2) without falling onto the at least one reinforcing core (61).

4. The apparatus of claim 2 wherein the at least one reinforcing core (61) is cord-shaped.

5. The apparatus of claim 1, wherein the cogged profile (40) of the pulley (2) is composed of a regular succession of identical primary cogs (9) and one or more prominences (41) arranged between adjacent primary cogs (9) each having a thickness which, measured in a circular direction along the pulley (2), is less than a thickness of a primary cog (9).

6. The apparatus of claim 5, wherein each prominence (41) exhibits a height which exceeds by at least twice a mean thickness thereof measured in a circular direction along the pulley (2).

7. The apparatus of claim 5 wherein each prominence (41) exhibits a height which is less than a height of a primary cog (9).

8. The apparatus of claim 1, wherein the external contact profiles (45, 46) of the lateral edges (3, 4) project with respect to the external contact profiles (25) of the pulley (2), the prefabricated belt (8) being gripped between the contrast belt (5) and the external contact profiles (45, 46) of the lateral edges (3, 4).

9. The apparatus of claim 1, wherein the external contact profiles (45, 46) of the lateral edges (3, 4) are aligned with the external contact profiles (25) of the pulley (2), the prefabricated belt (8) being gripped between the contrast belt (5) on one side and the external contact profiles (45, 46, 25) of the lateral edges (3, 4) and the pulley (2) on another side.

10. The apparatus of claim 1, wherein the external profile contacts (45, 46) of the lateral edges (3, 4) project with respect to the external contact profiles (25) of the pulley (2) and in that the prefabricated belt (8) is dimensioned such as to insert between the external contact profiles (45, 46) of the lateral edges (3, 4).

11. The apparatus of claim 1 wherein the external contact profiles (25) of the pulley (2) each form at least one channel (74) for housing a corresponding at least one reinforcing core (61).

* * * * *